(No Model.)
G. W. FORBES.
CULTIVATOR.
No. 468,986. Patented Feb. 16, 1892.
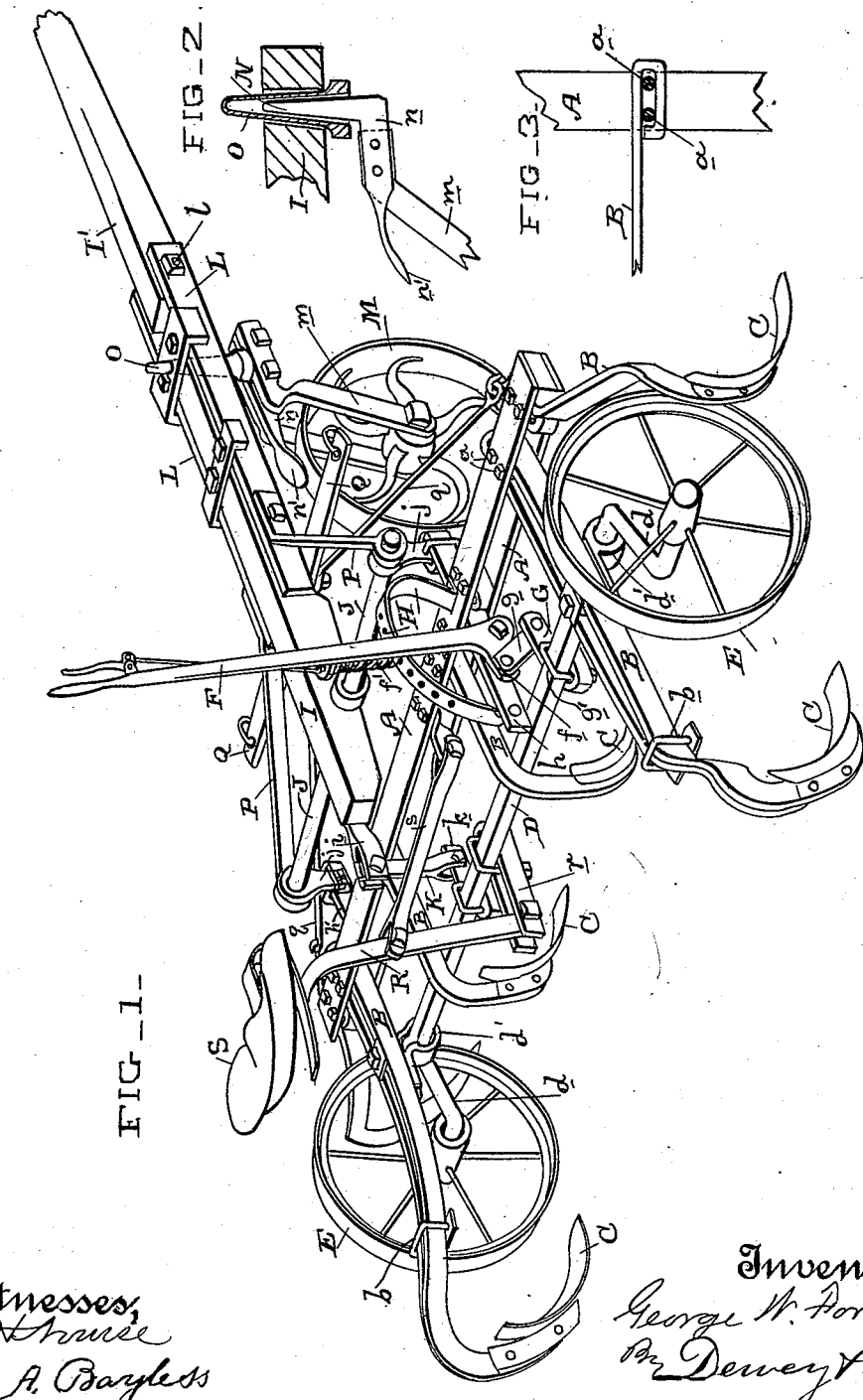
Witnesses:
J. A. Bayless
Inventor,
George W. Forbes
By Dewey & Co.
attys

UNITED STATES PATENT OFFICE.

GEORGE W. FORBES, OF GUBSERVILLE, CALIFORNIA.

CULTIVATOR.

SPECIFICATION forming part of Letters Patent No. 468,986, dated February 16, 1892.

Application filed May 15, 1891. Serial No. 392,829. (No model.)

*To all whom it may concern:*

Be it known that I, GEORGE W. FORBES, a citizen of the United States, residing at Gubserville, Santa Clara county, State of California, have invented an Improvement in Cultivators; and I hereby declare the following to be a full, clear, and exact description of the same.

My invention relates to the class of wheeled cultivators; and it consists in the novel construction and combination of parts hereinafter fully described, and specifically pointed out in the claims.

The objects of my invention are to raise both ends of the cultivator equally and level and without strain on the neck-yokes of the horses, to secure the tooth-shanks in a simple and effective manner consistent with rigidity of the frame-beams, to secure the several connecting lugs and arms in a way at once simple and strong, and generally to provide a durable, effective, and readily operative and adjustable cultivator.

Referring to the accompanying drawings for a more complete explanation of my invention, Figure 1 is a perspective view of my cultivator. Fig. 2 is a detail of the pivotal connection of the front wheel. Fig. 3 is a detail showing the bend in the shanks B.

The frame of the machine is composed, essentially, of the main cross-beam A. This consists of two parallel plates, one above the other. Between these plates are inserted the tooth-shanks B, to the rear ends of which are properly secured the teeth C. These shanks are formed of bars which are bent at their forward ends and return parallel upon themselves, the longer shanks returning the whole way and the shorter shanks part or the whole way, as may be desired. The bend or bight of the shank passes on edge between the beam-plates and is secured therein by bolts $a$, passing through said plates and through the opening of the bend or bight, thereby clamping the shanks firmly between the beam-plates. Clips $b$ hold the parts of the shanks together. This construction renders it easy to secure the shanks to the beam and avoids weakening the beam, making a simple connection.

D is the axle, having cranks $d$, which carry the wheels E. The axle passes under the longer end shanks and the intermediate short shanks and is journaled in bearings $d'$ under the former.

F is the lever for raising and lowering the frame. It has a foot-crank $f$, which is connected by a link $g$ with a lug G, secured to the axle. This lug is bent upon itself at its rear end, passes under the axle, and receives the lower ends of clip $g'$, which embraces the axle and extends down through the opening of the bend or bight of the lug and receives nuts underneath to tighten the lug to the axle.

The lever F is pivoted to a bar $h$, which passes through and is properly secured to beam A. This bar also carries the rear end of the rack H, the forward end being secured to the beam, said rack receiving the usual pawl $f'$ of the lever.

The tongue is a sectional jointed one. The rear section I is pivoted on a cross-shaft J, supported at its ends by means of arms $j$, which are secured to the beam A, one by being clipped to the forward end of bar $h$ and the other to a lug $h'$, secured to the beam near the other end. The rear end of the rear tongue-section I is connected by a strap-iron $i$ with a link K, the lower end of which is pivoted to a forwardly-extending lug $k$, secured to the axle. The forward tongue-section I' is pivoted to the forward end of the rear tongue-section by means of forwardly-extending side plates L, secured to the rear section and overlapping the forward section on each side, the pivot-bolt $l$ passing through them and the intervening section, whereby the whole tongue is rigid sidewise, but may have an up-and-down movement on bolt $l$.

M is the front wheel of the implement. It is journaled in the lower ends of bearing-arms $m$, the upper ends of which receive the shank $n$ of the pintle-pin N, extending upwardly and journaled in a sleeve-bearing O, fitted in the forward end of the rear tongue-section I. From the rear end of shank $n$ extends a scraper $n'$, which operates over the rim of wheel M to keep it clean.

P are braces extending from the ends of shaft J to the rear tongue-section.

Q is the whiffletree, secured under said section, and $q$ are pull-rods extending to the beam-ends.

S is the driver's seat, supported by a standard R, the lower end of which is bolted to a lug r, extending rearwardly from the axle, said standard being braced from the beam by a connection s.

To raise the frame, the lever F is moved forwardly. This raises its foot-crank and through the link g and lug G raises the axle on its cranks turning in the hubs of the main wheels. This raising of the axle lifts the tooth-shanks which bear upon it. Now, to raise the frame-beam forward of the axle equally with the parts back of it another movement is simultaneously taking place. The turning of the axle in rising, as described, effects through the lug k and link K the lifting of the rear end of the rear tongue-section I, the movement of which, tending to depress its forward end turning upon shaft J, results in the bearing of said forward end upon the supports of the front wheel and the consequent bodily rise of said rear section with the wheel for a bearing, so that the beam A is lifted. Therefore the whole frame of the implement rises equally and level and the strain is borne by the forward wheel, being thus removed on account of the jointed tongue from the neck-yokes of the horses, where it usually falls. The position of the seat causes the weight of the driver to assist in this movement of the axle.

The construction of the tooth-shanks and the several lugs with bent ends enables me to readily secure them by passing the bolts or clips down through them and without weakening the parts to which they are attached. The two-part beam A is of advantage in receiving and clamping the tooth-shanks.

Having thus described my invention, what I claim as new, and desire to secure by Letters Patent, is—

1. In a cultivator, the combination of a wheeled crank-axle, a beam, tooth-shanks secured to said beam and passing over the axle, a jointed sectional tongue, connections between the rear section of said tongue and the beam and axle, a bearing-wheel under the forward end of said section, and a lever for turning the axle, substantially as herein described.

2. In a cultivator, the combination of a wheeled crank-axle, a beam, tooth-shanks secured to said beam and passing over the axle, a jointed sectional tongue, a connection between the rear section of said tongue and the beam, a link connecting the rear end of said section with a crank-lug on the axle, a bearing-wheel under the forward end of said section, and a lever for turning the axle, substantially as herein described.

3. In a cultivator, the combination of a wheeled crank-axle, a beam, tooth-shanks secured to said beam and extending over the axle, a jointed sectional tongue, a shaft carried by the beam and on which the rear tongue-section is pivoted, a crank-and-link connection between the axle and the rear end of the rear tongue-section, a bearing-wheel under the forward end of said section, and a lever and connections for turning the axle, substantially as herein described.

4. In a cultivator, the combination of a wheeled crank-axle, a beam, tooth-shanks secured to said beam and extending over the axle, a jointed sectional tongue, a pivotal connection between the rear section of said tongue and the beam, a crank-and-link connection between the rear end of said tongue-section and the axle, a bearing-wheel under the forward end of said section, a driver's seat carried by and back of the axle, and a lever and connections for turning the axle, substantially as herein described.

5. In a cultivator, the combination of a wheeled crank-axle, a beam forward of said axle, tooth-shanks secured to the beam and passing over and resting on the axle, a jointed sectional tongue, a shaft carried by the beam and on which the rear tongue-section is pivoted, a crank-and-link connection between the rear end of said section and the axle, a bearing-wheel under and pivoted to the forward end of the rear tongue-section, a lever pivotally connected with the beam, and a crank-and-link connection between said lever and the axle, substantially as herein described.

6. In a cultivator, the crank-axle, the beam A, consisting of separated parallel plates, the tooth-shanks passing over and resting on said axle and having bent ends lying between said plates, and the bolts passing through said plates and intervening bent ends, whereby the shanks are secured and clamped between the beam-plates, substantially as herein described.

In witness whereof I have hereunto set my hand.

GEORGE W. FORBES.

Witnesses:
J. P. MENTON,
J. A. LOVELL.